United States Patent [19]
Schalow et al.

[11] 3,964,677
[45] June 22, 1976

[54] ENERGY CONSERVING THERMOSTATIC CONTROL

[75] Inventors: Rudolph D. Schalow; John T. Link, both of Fort Wayne, Ind.

[73] Assignee: Energystics Corporation, Huntertown, Ind.

[22] Filed: Apr. 17, 1975

[21] Appl. No.: 568,846

[52] U.S. Cl. ............................. 236/46 R; 165/12; 219/492
[51] Int. Cl.² ......................................... F23N 5/20
[58] Field of Search ................ 236/46; 165/12, 26; 219/492 X, 491 X

[56] References Cited
UNITED STATES PATENTS

| | | | |
|---|---|---|---|
| 2,719,672 | 10/1955 | Jenkins | 236/46 |
| 3,301,482 | 1/1967 | Bullen | 236/46 |
| 3,392,914 | 7/1968 | Nienstaedt | 236/46 |

*Primary Examiner*—William E. Wayner
*Attorney, Agent, or Firm*—Lundy & Welch

[57] ABSTRACT

Disclosed is an energy conserving thermostatic control for use wih heating and/or air conditioning systems. The control includes solid state circuitry for automatically controlling or regulating the temperature of an area at at least two different selected temperatures at selected times and for selected periods. The control is compatible with conventional heating and/or air conditioning systems and in most instances can be installed therewith without modification or rewiring of the system.

19 Claims, 2 Drawing Figures

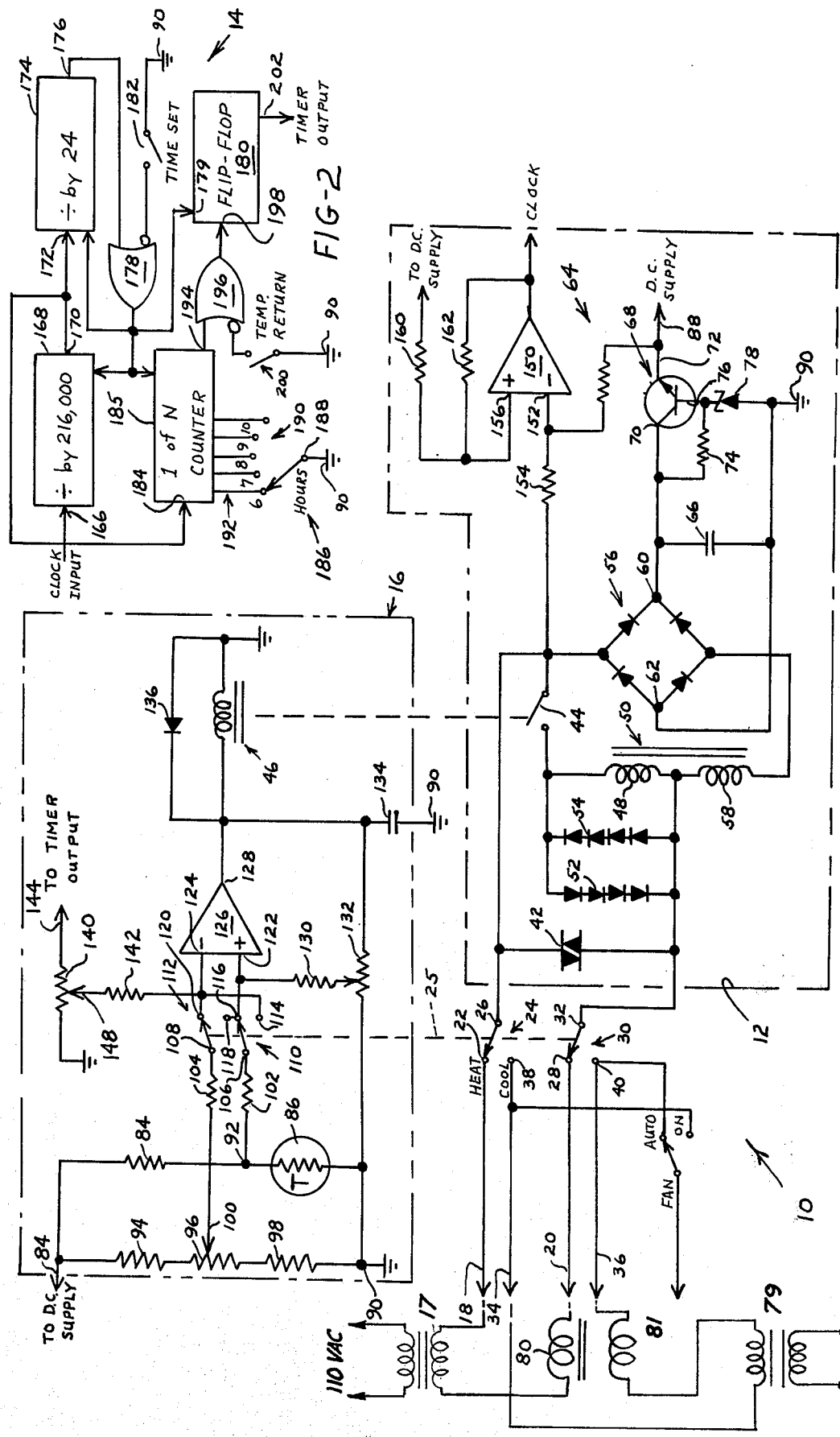

ENERGY CONSERVING THERMOSTATIC CONTROL

BACKGROUND OF THE INVENTION

1. Field of the Invention

The present invention relates to thermostatic controls for regulating the temperature in an area such as a house, office or the like and in particular to such a control which will automatically control a heating or air conditioning system to regulate the temperature therein at at least two different temperatures at selected times and for selected periods of time.

2. Description of the Prior Art

Thermostatic controls for controlling the heating and/or air conditioning systems of homes, offices, and other buildings to regulate the temperature therein are well known. Typically, such thermostatic controls are electro-mechanical devices which automatically cycle the furnace, air conditioning unit, and related equipment between "on" and "off" states to thereby maintain the temperature within the area within prescribed temperature limits. The regulated temperature is determined by manual setting of a "set point" device on the thermostatic control whereby the temperature can be regulated within a couple of degrees over a range of about 50°F to 90°F. The thermostatic control is typically mounted on a convenient wall within the dwelling, office, or the like and is coupled to the furnace or air conditioning unit via permanent wiring installed within the walls thereof.

Recently, the need for conserving energy has emphasized the value of such a thermostatic control which will automatically alter the regulated temperature within the area at different periods of the day in accordance with required "comfort" requirements. For example, it has been determined that the temperature in a home can be reduced significantly at night when the occupants are asleep without causing any discomfort. Such a reduction in the "nighttime" temperature of the dwelling results in a significant reduction in fuel consumption and heating (or cooling) cost for the dwelling.

However, manual alteration of the regulated temperature is not entirely satisfactory inasmuch as the dwelling, office or the like will be uncomfortably cool in the morning before it is manually reset and, due to the lag time of typical heating systems, time is required for the temperature of the dwelling to rise to a comfortable level for the normal daytime activities. Similarly, manual alteration of the regulated temperature at night may result in uncomfortably cool temperatures within the dwelling before the occupants have fallen asleep.

The need to manually alter the regulated temperature is of course always subject to the human failure of foregetting to change the thermostat setting at all whereby cost savings are lost.

Recently, there have been introduced energy conserving thermostats which will automatically regulate the temperature of a home, office, or the like at two different temperatures. These devices typically include some form of clock mechanism and means for setting the two selected operating temperatures. In a normal cycle, the energy conserving thermostat automatically reduces the regulated temperature of the dwelling at predetermined times of the day and automatically returns the temperature of the dwelling to the other of the regulated temperatures again at a selected time of day. Prior art energy conserving thermostats have, however, had some limitations inasmuch as they require rewiring of the heating and/or air conditioning system to accomodate the dual temperature thermostat. Such systems have also been typically electro-mechanical in nature whereby their versatility is limited and also requiring unnecessarily large amounts of power for their operation. Such devices are also prone to common failures of electro-mechanical systems.

SUMMARY OF THE INVENTION

The present invention is a fully solid state energy conserving thermostatic control that is compatible with conventional heating and/or air conditioning systems. The control of the present invention automatically controls the temperature in the control area at at least two selected temperatures. The control includes a clock or timing circuit and a logic circuit coupled thereto for generating a temperature shifting signal. A temperature regulating circuit is coupled to the timing circuit and is responsive to the temperature of the controlled area and the temperature shifting signal for effecting operation of the heating and/or air conditioning system thereby regulating the temperature at the two selected temperature levels. The temperature regulating circuit is coupled to a conventional furnace or air conditioning unit control relay and the entire circuit is operated from the conventional furnace power supply, typically a 24 volt alternating current source, without any modification or additional wiring thereto.

Broadly, the control of the present invention comprises source means adapted to be coupled to a conventional heating or heating and cooling system power supply. The source means supplies power to the control and generates a continuous clock pulse train of predetermined frequency. Timing means are coupled to the source means for generating a timed temperature shifting signal, the timing means including means for selectively setting or altering the relative time duration of the temperature shifting signal and the time of occurrence thereof. A temperature regulating circuit means is provided and includes temperature set point means for selecting the normal regulated temperature of the control area. The regulating circuit means generates a modulating signal to control the heating or heating and cooling system and thereby the temperature in the controlled area at the temperature selected by the set point means. The temperature regulating means is connected to a timing means to receive the temperature shifting signal. The timing means further includes means for selecting the time duration of the temperature shifting signal and means for altering the magnitude thereof.

In one specific embodiment of the invention, the source means includes a unique auto transformer circuit for generating the required operating voltages for the circuit irrespective of whether the heating relay of the system is open or closed.

The circuit is solid state and incorporates current differential amplifiers and micro-circuit counting and logic devices for minimum power consumption whereby the system can operate from an existing system low voltage power source without interferring with the operation thereof.

It is therefore an object of the invention to provide an improved energy conserving thermostatic control for use with heating and/or air conditioning systems.

It is another object of the invention to provide such a control which will automatically regulate the temperature within a prescribed area at at least two different selected temperatures at selected times.

Still another object of the invention is to provide such a control which will automatically reduce the temperature in a temperature controlled area by a selected amount at selected times of the day or week and for a selected period of time.

Another object of the invention is to provide such a control which will automatically return the temperature in the controlled area to a normal regulated temperature automatically.

Still another object of the invention is to provide such a control which, once it has been initially set, cyclically regulates the temperature in the controlled area between two different temperatures.

Another object of the invention is to provide such a control which is adapted for use with both heating or heating and air conditioning systems without other modification thereof.

Yet another object of the invention is to provide such a control which consumes a minimum of power and which can be installed with conventional heating and-/or air conditioning systems without any modification to the existing power source or wiring thereof.

Another object of the invention is to provide such a control which includes means for setting the regulated temperatures, and means for altering the relative time duration at which the system will operate at the two selected temperatures.

Still another object of the invention is to provide such a control which permits the temporary resetting of the controlled temperature without otherwise altering the cyclical operation thereof.

Another object of the invention is to effect such a control which operates with substantially identical temperature offsets in both heating and cooling modes.

BRIEF DESCRIPTION OF THE DRAWINGS

The above mentioned and other features and objects of this invention and the manner of attaining them will become more apparent and the invention itself will be best understood by reference to the following description of an embodiment of the invention taken in conjunction with the accompanying drawings, wherein:

FIG. 1 is an electrical schematic of an energy conserving thermostat in accordance with the present invention; and FIG. 2 is a simplified block diagram of the timing means used in the present invention.

DESCRIPTION OF A SPECIFIC EMBODIMENT

Referring now to the drawings there is shown in FIG. 1 an energy conserving thermostatic control 10 comprising generally source means 12 for supplying energy and a clock pulse signal to the system, timing circuit means 14 (FIG. 2) coupled to the source means 12 to receive the timing signal therefrom for generating a temperature shifting signal in response thereto as will be explained in detail below, and a temperature regulating circuit 16 coupled to the timing circuit means 14 to receive a temperature shifting signal from circuit 16, and further including circuit means described in detail below for sensing and regulating the temperature in a prescribed area such as a home, office or the like.

A typical conventional heating system includes a low voltage power supply, typically 24 volts AC which is supplied by a voltage step-down transformer 17 located adjacent the furnace (not shown) or cooling unit. This power is transmitted to a thermostat location typically located centrally within the area being heated, by a first conductor 18. A second conductor 20 also extends between the thermostat location and the heating and/or cooling unit and provides a return or reference conductor to a conventional heating unit relay 80. Conductor 18 is connected to one contact 22 of one set of contacts 24 of a ganged two position "heat-cool" switch 25. The common terminal 26 of contacts 24 constitutes the input terminal of the source means 12. Similarly, conductor 20 is connected to contact 28 of a second set of contacts 30 of switch 25 and the common 32 thereof is connected to the other input terminal of source means 12. A second pair of conductors 34, 36 are connected to a standard low voltage power source 79 and relay 81 to operate an air conditioning unit (not shown) and to the remaining terminals 38, 40 of contact sets 24, 30, respectively. Since the heating unit (or cooling unit) relay 80 is connected in series with the conventional thermostat, conductors 20, 36 are only virtual grounds and the voltage on conductors 24, 36 will be either 0 volts AC, when the heating or cooling unit relay is deenergized, or 24 volts AC when the relay is energized. It is apparent that such a source of operating potential is unsatisfactory since the control 10 must operate continuously irrespective of whether the heating or cooling system is at that moment energized of deenergized. The energy available from the low voltage power sources may be supplied to the source means 12 from the then unused one of either the low voltage source of the heating unit (not shown) or the air conditioning unit (not shown) if both are available depending upon which system is in use by means of suitable contact sets.

However, in the common instance wherein only one low voltage power source is available a special source must be provided. This is effected by source means 12. Means 12 includes a varistor 42 which is connected between switch terminals 26, 32 and functions to eliminate transients that may occur in the input power. The contacts 44 of a heating control relay 46 and the primary winding 48 of an autotransformer 50 are connected electrically in series between terminals 26, 32. Two sets of diodes 52, 54 are oppositely electrically connected in shunt with the primary winding 48, diodes 52, 54 functioning as voltage limiters across the primary winding 48.

A diode bridge 56 and the secondary winding 58 of transformer 50 are also connected between terminals 26, 32. The output terminals 60, 62 of diode bridge 56 have connected thereacross a voltage regulating and filtering circuit 64. Circuit 64 includes a filter capacitor 66 and an NPN Transistor 68, the collector 70 of transistor 68 being connected to terminals 60 and the emitter 72 thereof to the DC output supply terminal for the circuit. A biasing resistor 74 is connected between collector 70 and base 76 and a zener diode 78 is connected between base 76 and terminal 62. In operation, circuit 64 regulates and filters the rectified 24 volt AC supply voltage to provide a stable direct current supply voltage for the circuit.

In operation, when relay contacts 44 are open, the low voltage input (the 24 volt AC supply) appears across the diode bridge 56, secondary winding 58, and the conventional furnace relay 80. The impedance of the furnace relay 80 is much less than that of the transformer winding 58 and diode bridge 56 (with this circuit load) so that all but about 2 volts of the supply voltage appears across terminals 26, 32. Of the about 22 volts, about one half thereof appears across secondary winding 58 whereby adequate electronic power is provided for the circuit by the diode bridge.

When relay contacts 44 are closed, the voltage between terminals 26, 32 appears across the primary winding 48 of transformer 50 and is typically about 3 volts. Because the impedance of the furnace relays encountered in typical systems may vary substantially, from 30 to 150 Ohms for example, diodes 52, 54 are placed across primary winding 52 to keep the voltage limited at a low level regardless of the variations. The peak voltage on the primary winding 48 is therefore limited to the sum of the forward diode voltage drops in each set of diodes 52, 54. This is required to insure that when relay contacts 44 are closed, there will be enough voltage to activate the furnace relay. In a working embodiment, transformer 50 is wound with a 5:1 turns ratio, whereby approximately 18 volts appears across bridge 56 even though relay contacts 44 are closed and the major portion of the 24 volt AC supply voltage appears across furnace relay 80.

The regulating circuit 64 produces a smooth direct current supply voltage of about 12 volts. Only a small amount of current is passed by resistor 74 through the zener diode 78 for regulation to establish the desired DC level. Transistor 68 is forward biased by the zener diode 78 and the DC output voltage is the zener voltage less a nominal base-emitter voltage drop.

The varistor 42 described above, in addition to eliminating transients from the supply voltage, reduces sparking across the relay contacts 44. If contact sets 24, 30 are moved to their opposite positions, the operation of the circuit is the same except that the supply voltage is received from an air conditioning unit step-down transformer and the return is through conductor 36 which is connected to the high side of a cooling relay (not shown). Of course, the step-down transformer may be common for both heating and cooling. In this case contacts 18, 34 are connected together.

Temperature regulating circuit 16 includes a temperature sensing circuit which includes a resistor 84 and a thermistor 86 connected electrically in series between positive source terminal 88 and reference terminal 90. Together, resistor 84 and thermistor 86 form a network whose output voltage at terminal 92 is a substantially linear function of temperature over a relatively wide range of temperatures, the voltage decreasing as the temperataure increases.

A temperature set point network includes serially connected resistors 94, 96, and 98, resistor 96 being a variable resistor having a variable output tap 100. Resistors 94, 96, and 98 are also connected electrically in series between terminal 88 and reference terminal 90 and their values are chosen so that the voltage at tap 100 can be varied over a selected range of values about equal to those that will be encountered at terminal 92.

Terminals 92 and 100 are connected via resistors 102, 104, respectively to the common terminals 106, 108 of "heat-cool" contact sets 110, 112 of switch 25. The throws 114, 116 and 118, 120 of contact sets 110, 112 are cross connected to the positive and negative input terminals 122, 124 of a differential current amplifier 126.

It should be observed that resistors 102, 104 have substantially higher values than thermistor 86, resistor 84 and the resistors 94, 96, and 98, whereby there is substantially no loading on the temperature sensing or set point networks.

If the voltage at terminal 100 is higher than the voltage at terminal 92, there will be more current to the minus input terminal 124 of amplifier 126 than to the positive terminal 122 thereof. Under these conditions, the output of amplifier 126 is low or off and the relay of coil 46 is not energized. If, on the other hand, the voltage at terminal 100 remains unchanged, while the voltage at terminal 92 rises as a result of the ambient temperature in the area being controlled becoming cooler, there will be more current into the positive terminal 122 of amplifier 126 than into the negative terminal 124 thereof. Under these conditions, the output of amplifier 126 will go high thereby energizing the coil of relay 46 and the heating relay contacts 44 will be closed.

Positive feedback is provided from the output 128 of amplifier 126 through a fixed resistor 130 and a variable resistor 132 to the positive input terminal 122 of amplifier 126. This positive feedback causes amplifier 126 to operate as a Schmitt trigger circuit such that the transistors between on and off are positive and substantially instantaneous The values of resistors 130, 132 are chosen to provide a definite amount of hysteresis so that the amplifier is not trying to switch both on and off at the same temperature. This function also replaces the anticipator commonly used in conventional thermostats.

For example, assuming that the output of amplifier 126 is low, as the temperature cools the resistance of thermistor 86 increases just enough to cause an increase in the current into positive terminal 122. This condition progresses until amplifier 126 is rendered on and saturates. Conversely, as the temperature in the area increases, the resistance of thermistor 86 decreases causing a decreasing current to flow into the positive terminal 122. However, the current must decrease by an amount equivalent to the amount of positive feedback current through resistors 132 and 130 before amplifier 126 is rendered off. In a typical situation, resistor 132 is adjusted to provide a 1°F hysteresis in the on-off switching of amplifier 126.

A capacitor 134 is connected between output terminal 128 and ground 90 and functions to delay the rise in the output of amplifier 126 sufficiently to assure positive switching. A diode 136 may also be provided connected in shunt with the coil of relay 46 to prevent transients from possibly degrading the performance of amplifier 126.

If switches 110, 112 are moved to their opposite poles, it will be observed that the effect of the thermistor 86 is reversed whereby increasing temperatures will activate relay 46 while cooler temperatures will deactivate same. Because the same amplifier set point, hysteresis etc. elements are used for both heating and cooling modes, temperature off set, hysteresis and the like is substantially identical for both modes.

Still referring to FIG. 1, it is a purpose of the invention to provide for automatic reduction of the controlled temperature or set point temperature during certain periods of the day during the heating season and, conversely, to automatically increase the controlled temperature in the area during certain periods of the day during a cooling season.

This is effected by a resistor network including resistors 140, 142, resistor 140 being a variable resistor, coupled between ground 90 and the timing circuit to be described in detail below. If it is first assumed that there is no voltage applied to terminal 144, no additional current is injected into the minus terminal 124 of amplifier 126. Further, if the value of resistor 142 is much greater than the input resistance of the minus terminal 124, substantially no current is bled away from the amplifier 126.

If, however, a positive voltage is applied to terminal 144, an additional current is injected into the negative terminal 124. This has the same effect on amplifier 126 as would result if the voltage at terminal 100 was set higher, i.e., a cooler temperature was desired. The actual amount of this injected current is controlled by adjusting resistor 140. Typically, the combination of resistors 140, 142 is selected such that about a 0°F to 10°F differential is provided by adjusting resistor 140 between its extremes. It will thus be seen that the presence or absence of a voltage at terminal 144 will effect a shift in the set point or controlled temperature of the area. It will further be observed that if the contact sets 110, 112 are set in their alternative positions, the operation or effect will be reversed and the appearance of a positive voltage at terminal 144 will have the same effect as if the temperature in the controlled area was warmer than indicated by the setting of resistor 96. Resistor 96 is provided with a suitable scale associated with the wiper thereof which scale is calibrated in degrees fahrenheit and will typically have a range of 50°F to 90°F. Similarly, the wiper 148 of resistor 140 is provided with a suitable scale whereby it will indicate a temperature range of 0°F to 10°F.

An amplifier circuit 150 has its negative input terminal 152 connected to terminal 26 through a resistor 154 and its positive input terminal 156 is connected to DC source terminal 88 through another resistor 160. A feedback resistor 162 is connected between the output terminal 164 of amplifier 150 and input terminal 156 thereof. Thus connected, amplifier 150 functions as a Schmitt trigger pulse generator responsive to each cycle of the 24 volt AC supply voltage above mentioned. With appropriately selected values, the amplifier circuit 150 will shift to a high level output when the input signal thereto reaches about 10 volts and will shift to a low level output when the input thereto shifts to about 8 volts; referenced to circuit ground 90.

Referring now to FIG. 2, there is illustrated a timing circuit coupled between the source means 12 and temperature regulating circuit 16 to effect automatic shifting of the regulated temperature. The 60 Hertz pulse signal from amplifier 150 is applied to the input terminal 166 of a multistage divider circuit 168 which frequency divides the input pulse train by 216,000 thereby generating one output pulse at its output terminal 170 each hour. This one pulse per hour signal is applied to input terminal 172 of another divider circuit 174 wherein it is divided by 24 to thereby generate one pulse each 24 hours at its output terminal 176. This signal is applied through an OR gate 178 to the "set" input terminal 179 of a flip-flop 180. A momentary contact "time set" switch 182 is connected between ground or reference 90 and set input terminal 179 through OR gate 178. Simultaneously, the one cycle per hour pulse signal appearing at terminal 170 is applied to the count input terminal 184 of a conventional 1 of N counter.

A multiple position switch 186 has its common terminal 188 connected to ground 90 and individual ones of its contacts 190 connected to selected ones of the "N select" input terminals 192 of the "1 of N" counter 185. The output of counter 185 appearing at terminal 194 is supplied through a second OR gate 196 to the "reset" input terminal 198 of flip-flop 180. A second momentary contact switch 200 denoted "temperature return" is connected from ground 90 to reset terminal 198 through OR gate 196.

In operation, at that time of day and on the first day when it is desired to have the energy conserving thermostatic control alter the regulated temperature in an area, the time set switch 182 is momentarily closed. This automatically resets all of the counters of the circuit to their initialized states. In the case of flip-flop 180, this pulse is applied to the set terminal 179 whereby the output at output terminal 202 thereof goes high. This output terminal is coupled to terminal 144 of the temperature regulating circuit 16 (FIG. 1). It will thus be seen that when the time set switch 182 is closed, the temperature setting of the temperature regulating circuit 16 is automatically shifted to indicate that the room is a predetermined number of degrees above the desired level (or below the desired level if the system is set for cooling).

Simultaneously the one cycle per hour pulses are applied to counter 185. The switch 186 is also set to a selected one of its output positions. When the number of pulses applied to counter 185 correspond to the setting of switch 186 (sensed via terminals 192 connected thereto) counter 185 will generate an output pulse at its output terminal at 194 which is applied as a "reset" signal to flip-flop 180. This causes the output at output terminal 202 of flip-flop 180 to shift again to a low or zero output level whereby the shifting signal applied to the temperature regulating circuit 16 is removed. It will thus be observed that by proper selection of the input logic within the 1 of N counter 185, the terminals of switch 186 can be made to correspond to hour counts of 6, 7, 8, 9, or 10 hours. Other hour settings could of course be selected such that the switch positions will correspond to time elapses of from 1 to 24 hours for example. It will further be observed that the circuit, because it automatically recycles once each 24 hours will, once initialized by operation of switch 182, continuously repeat this cycle once each day whereby the temperature established by the temperature regulating circuit 16 will automatically be shifted at the same time of each day. This time is established by the time when the time set switch 182 was first operated.

In the event that it is desired to return the regulated temperature to its normal level before counter 185 generates a reset signal, momentary closure of the temperature return switch 200 will apply a reset signal to flip-flop 180 resetting same to thereby remove the temperature shifting signal. It will be observed that closure of switch 200 does not otherwise affect the circuit whereby the circuit will still automatically shift the temperature at the same time of day as determined by the previous operation of the time switch 182.

Other logic arrangements can be utilized in accordance with the principals of the present invention to effect different time cycles. The temperature could be cycled up and down more than once each day by the addition of suitable counters or logic in counter 185. Additional divider circuits could be used to effect an automatic temperature shift at intervals greater than 24 hours. Other variations of the circuit will be apparent to those skilled in the art in view of the above disclosure to effect different time-temperature regulation and temperature shifting as desired.

It will be observed that the energy conserving thermostatic control of the present invention does not require any modification of the wiring of an existing low voltage controlled heating, cooling, or heating and cooling system. Preferably all of the counting and logic circuits utilized with the present invention are CMOS circuits and it will be observed that power consumption of the circuit is relatively low. The entire circuit is solid state whereby it provides high reliability and compactness. The circuit provides for automatic shifting of a temperature within a controlled area at a predetermined time of day and for a predetermined period of time. The temperature can be simply and easily returned to a normal regulated level without otherwise affecting operation of the circuit.

While there have been described above the principle of this invention in connection with specific apparatus, it is to be clearly understood that this description is made only by way of example and not as a limitation to the scope of the invention.

What is claimed is:

1. A thermostatic control for use with a heating/cooling system which includes a source of low voltage operating potential and a system control relay connected electrically in series therewith, a thermostatic control comprising source means connected electrically in series with said low voltage source for providing a continuous source of operating energy for said control irrespective of the operating state of said relay, and for generating a continuous clock pulse train of predetermined frequency, timing means coupled to said source means for cyclically generating a temperature set point shifting signal at predetermined time intervals, said timing means including means for selecting the time duration of said shifting signal and means for selecting the magnitude thereof, temperature regulating circuit means including temperature set point means for generating a set point control signal and temperature sensing means for generating a variable control signal proportional to the temperature in said area for generating a modulating signal to control the system, and thereby the temperature, in said area, said regulating circuit being connected to said timing means to receive said temperature shifting signal and being responsive thereto to alter one of said control signals and thereby the regulated temperature in said area.

2. The control of claim 1 wherein said system control relay operates between off and on conditions in response to a predetermined voltage, the voltage across said source means plus said predetermined voltage being less than or equal to the output voltage of said system power supply.

3. The control of claim 2 wherein the power requirements of said control are substantially less than the power capacity of said system power supply, whereby, operation of said system relay is unaffected by operation of said control.

4. The control of claim 2 wherein said source means further includes voltage regulating means connected to said rectifying means to generate a direct current voltage in response thereto.

5. The control of claim 4 wherein said pulse generating means includes a Schmitt trigger circuit.

6. The control of claim 1 wherein said temperature regulating circuit means includes modulating switch means connected electrically in series with the relay of said heating system, said source means including an auto transformer having the primary winding thereof connected electrically in series with said regulating switch means, said source means further including rectifying means, the secondary winding of said auto transformer and said rectifying means being connected electrically in shunt with said regulating relay contacts and said primary winding.

7. The control of claim 6 further including voltage limiting means connected electrically in shunt with the primary winding of said auto transformer.

8. The control of claim 1 wherein said temperature regulating means includes a differential current amplifier, switch means operatively connected to the output of said differential current amplifier, said temperature set point circuit generating a manually variable current set point signal, said temperature sensing circuit generating a current signal variable in response to the temperature in said area, said differential amplifier having first and second inputs connected to receive predetermined ones of said current signals and being responsive to the difference therebetween for generating said modulating signal.

9. The control of claim 8 further including heat-cool switch means connected between said first and second inputs and the outputs of said temperature set point circuit and said temperature sensing circuit for selectively reversing the connection therebetween and thereby the operation of said temperature regulating circuit means whereby the same said differential amplifier will control said heating/cooling system in both heating and cooling modes.

10. The control of claim 9 wherein said temperature sensing circuit includes a thermistor, the output current of said circuit varying inversely with temperature.

11. The control of claim 9 wherein said differential amplifier further includes a feedback network whereby said amplifier switches between on and off states, said feedback network including a variable resistance selectively adjustable to alter the hysteresis of said Schmitt trigger circuit.

12. The control of claim 1 wherein said timing means includes frequency dividing circuit means connected to said pulse generator means to generate a pulse signal at selected time intervals and counter means connected to said pulse generator means for generating a pulse control signal a predetermined period of time after the occurrence of each of said pulse signal, said timing means further including a bistable circuit connected to said dividing means and said counter means to generate said shifting signal in response to each said pulse signal and to terminate said shifting signal at a predetermined time period thereafter in response to said counter pulse control signal.

13. The control of claim 12 wherein said counter means includes means for selectively establishing the time period between said pulse signal and said control pulse.

14. The control of claim 13 wherein said counter is a 1 of N of counter having a plurality of integer set input terminals, said time period establishing means including a multiple position switch having a plurality of individually selectable positions, said counter being responsive to individual position settings of said multiple position switch to generate said control pulse at different time periods following said pulse signal.

15. The control of claim 12 wherein said temperature shifting signal means further includes variable resistance circuit means connected to said bistable circuit to receive said shifting signal and to one input of said temperature regulating circuit means to inject thereinto a current signal of a magnitude determined by said variable resistance means, said current signal effecting a shift in the selected regulated temperature in said area.

16. For use in a heating/cooling system including a source of low voltage operating potential and a system control relay connected electrically in series therewith, said relay being operable between on and off conditions in response to a predetermined voltage thereacross, a thermostatic control comprising source means operable in response to a second predetermined voltage for generating a continuous source of energy for said thermostatic control, said source means being connected electrically in series with said system relay, timing means coupled to said source means for cyclically generating a temperature set point shifting signal at predetermined time intervals, said timing means including means for selecting the time duration of said shifting signal and means for selecting the magnitude thereof, temperature regulating circuit means including temperature set point means for generating a set point control signal and temperature sensing means for generating a variable control signal proportional to the temperature in said area for generating a modulating signal to control the heating system, and thereby the temperature, in said area, said regulating circuit being connected to said timing means to receive said temperature shifting signal and being responsive thereto to alter one of said control signals and thereby the regulated temperature in said area.

17. The control of claim 16 wherein said temperature regulating circuit means includes a regulating switch means connected electrically in series with the relay of said heating system, said source means including an auto transformer having the primary winding thereof connected electrically in series with said switch means, said source means further including rectifying means, the secondary winding of said auto transformer and said rectifying means being connected electrically in shunt with said switch means and said primary winding.

18. The control of claim 17 wherein said source of low voltage operating potential includes a pair of output terminals, said system relay being connected electrically in series with one of said terminals, a pair of conductors extending between the other of said terminals and said relay, the voltage at the distal ends of said conductors shifting between relatively high and low voltage levels when said system relay is deenergized and energized, respectively, said primary winding generating a voltage in said secondary winding of a value substantially equal to said low voltage source potential when said regulating switch means is conductive, said primary winding being inactive when said regulating switch means is non-conductive, whereby the output potential of said transformer is substantially constant irrespective of the operating condition of said system relay.

19. A thermostatic control for use with a heating/cooling system which includes a source of low voltage operating potential and a system control relay connected electrically in series therewith, a thermostatic control comprising source means connected to said low voltage source for providing a continuous source of operating energy for said control and for generating a continuous clock pulse train of predetermined frequency, timing means coupled to said source means for cyclically generating a temperature set point shifting signal at predetermined time intervals, said timing means including means for selecting the time duration of said shifting signal and means for selecting the magnitude thereof, temperature regulating circuit means including temperature set point means for generating a set point control signal and temperature sensing means for generating a variable control signal proportional to the temperature in said area for generating a modulating signal to control the system, and thereby the temperature, in said area, said regulating circuit being connected to said timing means to receive said temperature shifting signal and being responsive thereto to alter one of said control signals and thereby the regulated temperature in said area, said source means, timing means, and temperature regulating circuit means being miniaturized solid state electronic circuits having a power consumption substantially less than the power capacity of said source of low voltage operating potential.

* * * * *

UNITED STATES PATENT OFFICE
CERTIFICATE OF CORRECTION

Patent No. 3,964,677　　　　　　　　Dated June 22, 1976

Inventor(s)　　Schalow et al

It is certified that error appears in the above-identified patent and that said Letters Patent are hereby corrected as shown below:

Column 4, line 29 delete "of" insert -- or --.
Column 6, line 8 after "or" insert -- "off" --.
Column 6, line 24 after "between" insert -- "on" -- and after "and" insert -- "off" --.
Column 6, line 25 after "instantaneous" insert -- . --.
Column 6, line 27 after "both" insert -- "on" -- and after "and" insert -- "off" --.
Column 6, line 29 after "the" insert -- "anticipator" --.
Column 6, line 35 after "rendered" insert -- "on" --.
Column 6, line 42 after "rendered" insert -- "off" --.
Column 6, line 44 after "the" insert -- "on-off" --.
Column 7, line 62 after "and" insert -- "set" --.
Column 8, line 37 after "the" insert -- "1 of N" --.
Column 8, line 49 after "the" second occurrence insert -- "time set" --.
Column 8, line 53 after "a" insert -- "reset" --.
Column 8, line 53 after "the" insert -- "tem- --.
Column 8, line 53 after "perature" insert -- return" --.
Column 9, line 51 after "between" insert -- "off" -- and after "and" insert -- "on" --.
Column 10, line 40 after "between" insert -- "on" -- and after "and" insert -- "off" --.
Column 10, line 62 after "a" insert -- "1 of N" --.
Column 11, line 13 after "between" insert -- "on" -- and after "and" insert -- "off" --.

Signed and Sealed this

Twenty-first Day of September 1976

[SEAL]

Attest:

RUTH C. MASON
Attesting Officer

C. MARSHALL DANN
Commissioner of Patents and Trademarks